US012756294B2

(12) United States Patent
Lai et al.

(10) Patent No.: US 12,756,294 B2
(45) Date of Patent: Oct. 6, 2026

(54) POWER SUPPLY APPARATUS

(71) Applicant: Delta Electronics, Inc., Taoyuan City (TW)

(72) Inventors: Chien-An Lai, Taoyuan City (TW); I Chen, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 193 days.

(21) Appl. No.: 18/656,408

(22) Filed: May 6, 2024

(65) Prior Publication Data

US 2024/0429809 A1 Dec. 26, 2024

Related U.S. Application Data

(60) Provisional application No. 63/521,950, filed on Jun. 20, 2023.

(30) Foreign Application Priority Data

Mar. 20, 2024 (CN) ........................ 202410319855.4

(51) Int. Cl.
*H02M 1/14* (2006.01)
*H02M 1/42* (2007.01)
(Continued)

(52) U.S. Cl.
CPC ............... *H02M 1/14* (2013.01); *H02M 1/42* (2013.01); *H02M 3/01* (2021.05); *H02M 3/33523* (2013.01)

(58) Field of Classification Search
CPC ........ H02M 1/0006; H02M 1/14; H02M 1/42; H02M 3/01; H02M 3/33523; H02M 1/007;
(Continued)

(56) References Cited

U.S. PATENT DOCUMENTS 9,190,898 B2 11/2015 Brinlee et al.
10,374,519 B2 8/2019 Deng et al.
(Continued)

FOREIGN PATENT DOCUMENTS

CN 104079152 B 7/2016
CN 106329895 A 1/2017
(Continued)

*Primary Examiner* — Thienvu V Tran
*Assistant Examiner* — Lauren Ashley Shaw
(74) *Attorney, Agent, or Firm* — KIRTON McCONKIE; Evan R. Witt

(57) ABSTRACT

A power supply apparatus includes a power factor correction circuit, an LLC converter, an auxiliary conversion circuit, a secondary side controller and a voltage tracking circuit. The power factor correction circuit is used for converting a DC link voltage into a first voltage. The LLC converter includes a primary side circuit and a secondary side circuit, which are coupled with each other. The primary side circuit receives the first voltage. The first voltage is converted into an auxiliary voltage by the auxiliary conversion circuit. The voltage tracking circuit detects the auxiliary voltage and issues a detection signal to the secondary side controller. The secondary side controller tracks a ripple change of the DC link voltage and instantly generates a reverse waveform opposite to a waveform of the DC link voltage. The secondary side controller controls the operations of the LLC converter according to the reverse waveform.

6 Claims, 3 Drawing Sheets

(51) Int. Cl.
*H02M 3/00* (2006.01)
*H02M 3/335* (2006.01)

(58) Field of Classification Search
CPC .. H02M 1/15; H02M 1/4225; H02M 3/33561; Y02B 70/10
USPC .......................................................... 363/21.02
See application file for complete search history.

(56) References Cited

U.S. PATENT DOCUMENTS

| | | | | |
|---|---|---|---|---|
| 2005/0185431 | A1 | 8/2005 | Shimizu et al. | |
| 2009/0091957 | A1* | 4/2009 | Orr | H02M 3/3376 363/79 |
| 2011/0216560 | A1* | 9/2011 | Ye | H02M 1/007 363/21.15 |
| 2012/0069603 | A1 | 3/2012 | Ryu et al. | |
| 2014/0176049 | A1 | 6/2014 | Yamada et al. | |
| 2016/0079872 | A1* | 3/2016 | Ryu | H02M 3/156 363/21.04 |
| 2017/0104417 | A1 | 4/2017 | Hung et al. | |

FOREIGN PATENT DOCUMENTS

| | | | |
|---|---|---|---|
| CN | 113595415 | A | 11/2021 |
| CN | 113726171 | A | 11/2021 |
| CN | 113346774 | A | 10/2022 |
| JP | 2000125547 | A | 4/2000 |
| JP | 2020173913 | A | 10/2020 |
| TW | 201626848 | A | 7/2016 |
| TW | I544302 | B | 8/2016 |

* cited by examiner

POWER SUPPLY APPARATUS

CROSS-REFERENCE TO RELATED APPLICATION

This application claims the benefit of U.S. Provisional Application Ser. No. 63/521,950 filed on Jun. 20, 2023, and claims priority to China Patent Application No. 202410319855.4 filed on Mar. 20, 2024, the entire contents of which are incorporated herein by reference for all purposes.

FIELD OF THE INVENTION

The present disclosure relates to a power supply apparatus, and more particularly to a power supply apparatus with a ripple compensation function.

BACKGROUND OF THE INVENTION

Power supply apparatuses are widely used in daily lives. Generally, an electronic product is equipped with a power supply apparatus for providing electric power to the components or electronic devices inside the electronic product. A power supply apparatus usually includes a power factor correction (PFC) circuit and an LLC resonant converter. The PFC circuit receives an AC voltage (e.g., the AC voltage from a utility power system). After the AC voltage is subjected to the power factor correction by the PFC circuit, a transition DC voltage is generated. The LLC resonant converter receives the transition DC voltage. In addition, the received transition DC voltage is converted into output DC voltages with different voltage levels in a resonant manner by the LLC resonant converter.

However, the existing power supply apparatus with the LLC resonant converter still has some drawbacks. For example, when the power supply apparatus is connected with the power grid through an uncontrolled rectifier bridge, the problem of generating double-frequency ripple occurs. The frequency of the double-frequency ripple is about 100 Hz, which is very harmful to the safe and stable operations of the power supply apparatus or even results in failure of the power supply apparatus.

For solving the above drawbacks, some power supply apparatuses are equipped with isolators such as optical couplers. Due to the arrangement of the isolator, the input voltage is transmitted to the controller on the secondary side of the power supply apparatus at the zero-crossing point. Consequently, the controller on the secondary side can reconstruct the waveform and adjust the reference voltage corresponding to the output voltage. In this way, the purpose of offsetting the ripple is achieved. However, different frequencies of the input voltages, different operating temperature conditions of the loads or other factors cause the changes of the capacitance values of capacitors, which will lead to different ripple changes. In other words, this approach is not comprehensive, and only the adjustment to a certain extent is permitted.

Furthermore, some power supply apparatuses use controllers to detect the ripples of the output voltage and separate the ripples. Consequently, a reverse waveform is created to control the ripples of the output voltage. However, the method of detecting the ripples of the output voltage can only control the ripples to a certain extent. In addition, this method is unable to deal with the source, and it is necessary to combine with the current feedback mechanism. Furthermore, in order to detect the bulk voltage, the controller needs to be located on the primary side. The method of using the controller to detect the ripples of the output voltage on the secondary side of the power supply apparatus is only suitable for handling the constant resistance loads but unable to handle the constant current loads.

Therefore, it is important to provide an improved power supply apparatus in order to overcome the drawbacks of the conventional technologies.

SUMMARY OF THE INVENTION

An object of the present disclosure provides a power supply apparatus. A voltage tracking circuit detects an auxiliary voltage from an auxiliary conversion circuit. A secondary side controller on the secondary side of the LLC converter instantly generates the reverse waveform that is opposite to the waveform of the DC link voltage. According to the ripple change of the DC link voltage, the secondary side controller controls the operations of the LLC converter. The power supply apparatus can directly customize a corresponding ripple compensation method according to the magnitude of the ripple source. Consequently, regardless of the input capacitance value, the input frequency change or the load change, the secondary side controller can give the optimized ripple compensation value.

In accordance with an aspect of the present disclosure, a power supply apparatus is provided. The power supply apparatus includes a power factor correction circuit, an LLC converter, an auxiliary conversion circuit, a secondary side controller and a voltage tracking circuit. The power factor correction circuit is used for converting a DC link voltage into a first voltage. The LLC converter includes a primary side circuit and a secondary side circuit, which are coupled with each other. The primary side circuit is electrically connected with the power factor correction circuit to receive the first voltage. The first voltage is converted into a second voltage by the LLC converter. The second voltage is outputted from the secondary side circuit. The auxiliary conversion circuit is electrically connected with the power factor correction circuit. The first voltage is converted into an auxiliary voltage by the auxiliary conversion circuit. The secondary side controller is disposed on a secondary side of the LLC converter. The secondary side controller controls operations of the LLC converter. The voltage tracking circuit is electrically connected to the auxiliary conversion circuit. The voltage tracking circuit detects the auxiliary voltage and issues a detection signal to the secondary side controller according to a result of detecting the auxiliary voltage. According to the detection signal, the secondary side controller tracks a ripple change of the DC link voltage and instantly generates a reverse waveform opposite to a waveform of the DC link voltage. In addition, the secondary side controller controls the operations of the LLC converter according to the reverse waveform. Consequently, the secondary side voltage ripples of the DC link voltage are suppressed.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
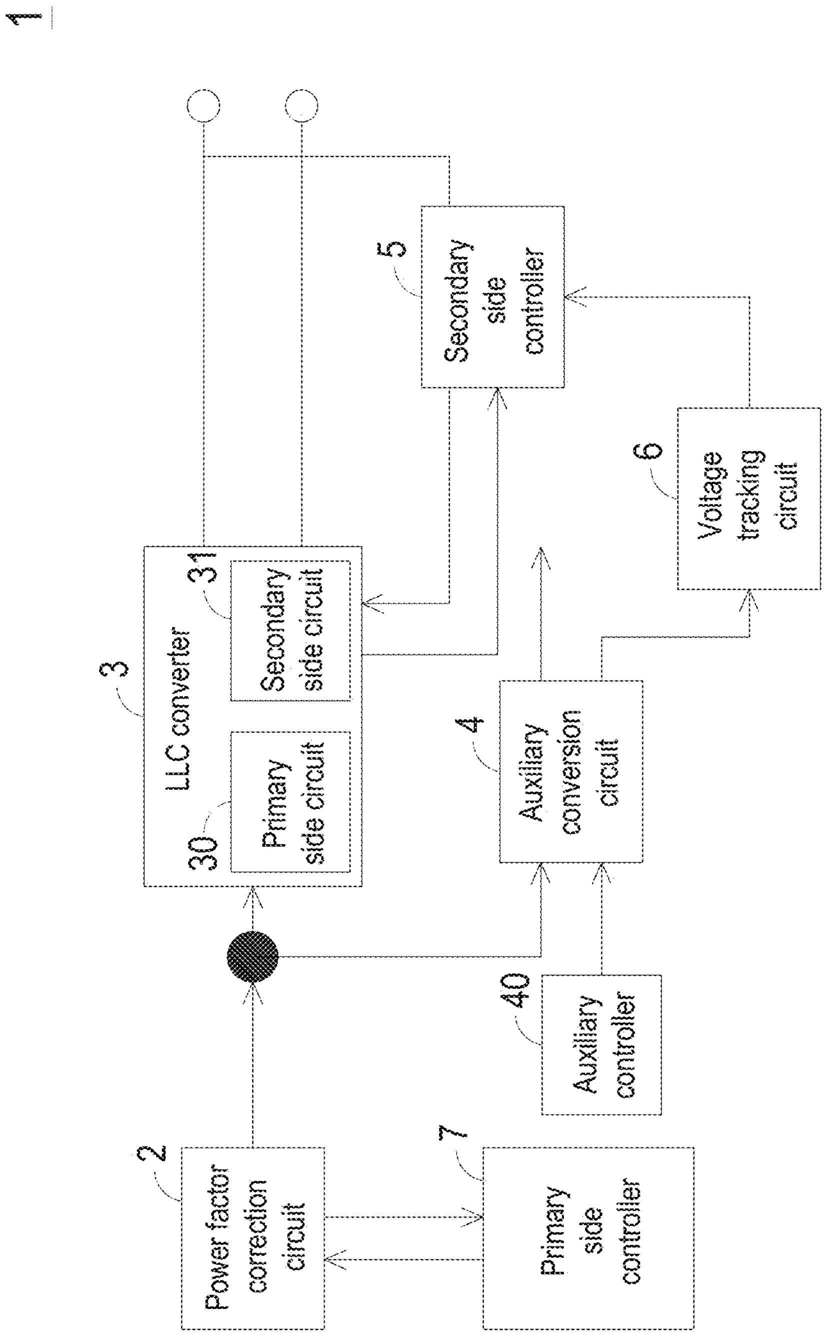
FIG. 1 is a schematic circuit block diagram illustrating the architecture of a power supply apparatus according to an embodiment of the present disclosure.
Figure 2:
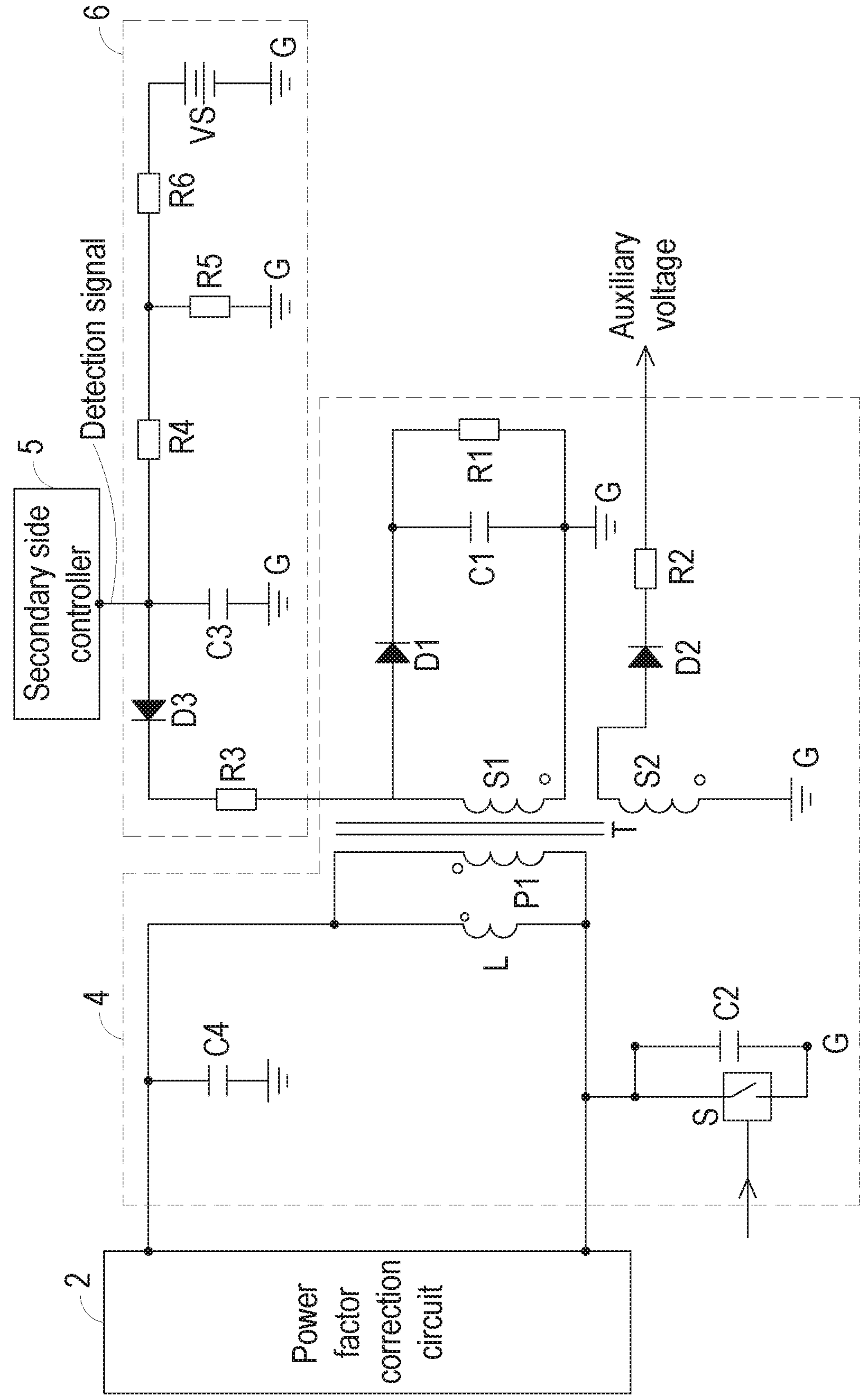
FIG. 2 a schematic circuit diagram illustrating the circuitry topology of a portion of the power supply apparatus shown in FIG. 1.
Figure 3:
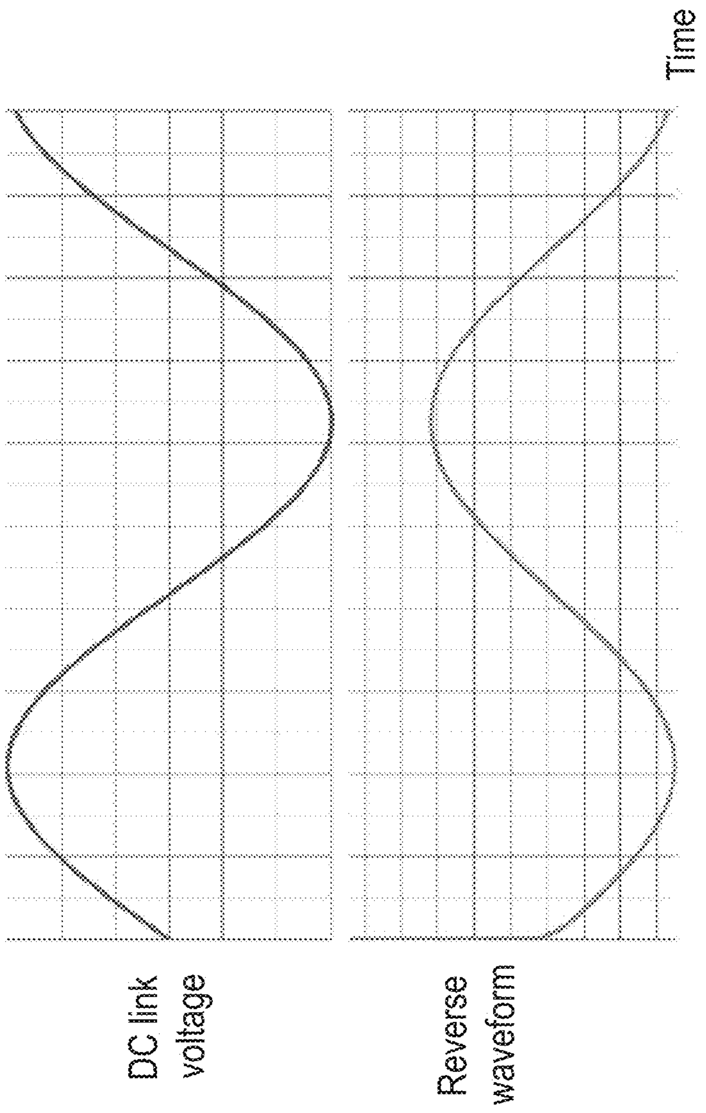
FIG. 3 is a schematic timing waveform diagram illustrating the DC link voltage received by the power supply apparatus and the detection signal at the first terminal of the third capacitor of the power supply apparatus.

Please refer to FIGS. 1, 2 and 3. FIG. 1 is a schematic circuit block diagram illustrating the architecture of a power supply apparatus according to an embodiment of the present disclosure. FIG. 2 a schematic circuit diagram illustrating the circuitry topology of a portion of the power supply apparatus shown in FIG. 1. FIG. 3 is a schematic timing waveform diagram illustrating the DC link voltage received by the power supply apparatus and the detection signal at the first terminal of the third capacitor of the power supply apparatus.

In an embodiment, the power supply apparatus 1 includes a power factor correction circuit 2, an LLC converter 3, an auxiliary conversion circuit 4, a secondary side controller 5 and a voltage tracking circuit 6.

The input terminal of the power factor correction circuit 2 receives the DC link voltage. After a power factor correction is performed on the DC link voltage by the power factor correction circuit 2, the DC link voltage is converted into a first voltage. The first voltage is outputted from the output terminal of the power factor correction circuit 2.

The input terminal of the LLC converter 3 is electrically connected with the output terminal of the power factor correction circuit 2. The output terminal of the LLC converter 3 is electrically connected with a load (not shown). The LLC converter 3 includes a primary side circuit 30 and a secondary side circuit 31, which are coupled with each other. The primary side circuit 30 is electrically connected with the input terminal of the LLC converter 3. The primary side circuit 30 receives the first voltage through the input terminal of the LLC converter 3. The output terminal of the secondary side circuit 31 is electrically connected with the output terminal of the LLC converter 3. After the first voltage is converted into a second voltage by the LLC converter 3, the second voltage is outputted from the output terminal of the LLC converter 3. In an embodiment, the primary side circuit 30 and the secondary side circuit 31 are coupled with each other through a transformer (not shown). The primary side circuit 30 is disposed on the primary side of the LLC converter 3. The secondary side circuit 31 is disposed on the secondary side of LLC converter 3.

The input terminal of the auxiliary conversion circuit 4 is electrically connected with the output terminal of the power factor correction circuit 2. By the auxiliary conversion circuit 4, the first voltage is converted into an auxiliary voltage (e.g., 12V). The auxiliary voltage is outputted from the output terminal of the auxiliary conversion circuit 4 to some components of the power supply apparatus 1 (e.g., fans and/or controllers).

Like the secondary side circuit 31, the secondary side controller 5 is disposed on the secondary side of the LLC converter 3. The secondary side controller 5 is used to control the operations of the LLC converter 3.

The voltage tracking circuit 6 is electrically connected with the output terminal of the auxiliary conversion circuit 4 for detecting the auxiliary voltage from the auxiliary conversion circuit 4. According to the result of detecting the auxiliary voltage, the voltage tracking circuit 6 issues a detection signal to the secondary side controller 5. According to the detection signal, the secondary side controller 5 tracks the ripple change of the DC link voltage and instantly generates a reverse waveform that is opposite to the waveform of the DC link voltage. An example of the reverse waveform is shown in FIG. 3. According to the reverse waveform, the secondary side controller 5 controls the operations of the LLC converter 3. Consequently, the secondary side voltage ripples of the DC link voltage can be effectively suppressed. The technology of controlling the operations of the LLC converter 3 to suppress the voltage ripples according to the ripple change of the DC link voltage is known in the art, and not redundantly described herein.

In accordance with a feature of the present disclosure, the voltage tracking circuit 6 detects the auxiliary voltage from the auxiliary conversion circuit 4 and provides the detection result to the secondary side controller 5, which is disposed on the secondary side of the LLC converter 3. According to the ripple change of the DC link voltage, the secondary side controller 5 instantly generates the reverse waveform that is opposite to the waveform of the DC link voltage. According to the reverse waveform, the secondary side controller 5 controls the operations of the LLC converter 3 in order to suppress the voltage ripples of the DC link voltage.

From the above descriptions, the power supply apparatus 1 of the present disclosure can directly customize a corresponding ripple compensation method according to the magnitude of the ripple source (i.e., the DC link voltage). Consequently, regardless of the input capacitance value, the input frequency change or the load change, the secondary side controller 5 can give the optimized ripple compensation value.

As mentioned above, the secondary side controller 5 instantly generates the reverse waveform opposite to the waveform of the DC link voltage according to the ripple change of the DC link voltage. Consequently, the ripple compensation purpose can be achieved. Since the ripple compensation is not based on the output voltage of the power supply apparatus 1 (i.e., the second voltage), the power supply apparatus 1 is capable of performing the ripple compensation for the constant resistance loads and the constant current loads.

In an embodiment, the auxiliary conversion circuit 4 includes a transformer T, a first diode D1, a first capacitor C1, a first resistor R1, a second diode D2, a second resistor R2, an auxiliary switch S and a second capacitor C2.

The transformer T includes a primary winding P1, a first secondary winding S1 and a second secondary winding S2. The first terminal of the primary winding P1 is a common-polarity terminal. The first terminal and the second terminal of the primary winding P1 are electrically connected with the output terminal of the power factor correction circuit 2. In addition, the primary winding P1 is reversely coupled with the first secondary winding S1 and the second secondary winding S2.

The first terminal of the auxiliary switch S is electrically connected with the second terminal of the primary winding P1. The second terminal of the auxiliary switch S is electrically connected with a ground terminal G.

The first terminal of the second capacitor C2 is electrically connected with the first terminal of the auxiliary switch S. The second terminal of the second capacitor C2 is electrically connected with the second terminal of the auxiliary switch S.

The first terminal of the first secondary winding S1 (i.e., a common-polarity terminal) is electrically connected with the ground terminal G. The second terminal of the first secondary winding S1 is electrically connected with the voltage tracking circuit 6. In addition, the auxiliary voltage is outputted from the second terminal of the first secondary winding S1.

The anode of the first diode D1 is electrically connected with the second terminal of the first secondary winding S1. The first terminal of the first capacitor C1 is electrically connected with the cathode of the first diode D1. The second terminal of the first capacitor C1 is electrically connected with the ground terminal G. The first resistor R1 and the first capacitor C1 are connected with each other in parallel. The first terminal of the second secondary winding S2 (i.e., a common-polarity terminal) is electrically connected with the ground terminal G. The anode of the second diode D2 is electrically connected with the second terminal of the second secondary winding S2. The first terminal of the second resistor R2 is electrically connected with the cathode of the second diode D2. The voltage at the second terminal of the second resistor R2 is equal to the auxiliary voltage.

The voltage tracking circuit 6 includes a third resistor R3, a third diode D3, a third capacitor C3, a fourth resistor R4, a fifth resistor R5 and a sixth resistor R6. The first terminal of the third resistor R3 is electrically connected with the second terminal of the first secondary winding S1. The cathode of the third diode D3 is electrically connected with the second terminal of the third resistor R3. The first terminal of the third capacitor C3 is electrically connected with the anode of the third diode D3. In addition, the first terminal of the third capacitor C3 is electrically connected with the secondary side controller 5. The first terminal of the third capacitor C3 issues the detection signal to the secondary side controller 5. The second terminal of the third capacitor C3 is electrically connected with the ground terminal G. The first terminal of the fourth resistor R4 is electrically connected with the anode of the third diode D3. The first terminal of the fifth resistor R5 is electrically connected with the second terminal of the fourth resistor R4. The second terminal of the fifth resistor R5 is electrically connected with the ground terminal G. The first terminal of the sixth resistor R6 is electrically connected with the second terminal of the fourth resistor R4. The second terminal of the sixth resistor R6 is electrically connected with a voltage source VS.

As shown in FIG. 2, the voltage of the detection signal at the first terminal of the third capacitor C3 may be expressed as the following formula:

$$Vc3 = -\frac{Ns1}{Np} \times Vin$$

In the above formula, Vc3 is the magnitude of the voltage of the detection signal at the first terminal of the third capacitor C3, Np is the turn number of the primary winding P1, Ns1 is the turn number of the first secondary winding S1, and Vin is the DC link voltage.

As mentioned above, the voltage waveform of the detection signal is the reverse waveform of the DC link voltage, and the voltage magnitude of the detection signal and the magnitude of the DC link voltage are in a proportional relation.

In an embodiment, the auxiliary conversion circuit 4 further includes a fourth capacitor C4 and an inductor L. The first terminal of the fourth capacitor C4 is electrically connected with the first terminal of the primary winding P1. The second terminal of the fourth capacitor C4 is electrically connected with the ground terminal. The inductor L is electrically connected between the first terminal and the second terminal of the primary winding P1.

The detection signal outputted from the voltage tracking circuit 6 can be used for ripple compensation. Furthermore, when there is a transient change in the utility power voltage, the DC link voltage will have corresponding drastic changes. The detection signal outputted from the voltage tracking circuit 6 can pre-warn the secondary side controller 5. Consequently, the secondary side controller 5 correspondingly controls the operations of the LLC converter 3. Since the second voltage output by the secondary side circuit 31 will not rise or drop with the transient change of the DC link voltage, the protecting purpose is achieved and the stability of the power supply apparatus 1 is enhanced.

Furthermore, the voltage tracking circuit 6 can be used to set different power-off voltages according to the capacitance decay conditions of different input capacitors and different load conditions. Generally, the load conditions are reflected on the secondary side of the LLC converter 3, and the information about the bulk voltage is reflected on the primary side of LLC converter 3. Since the detection signal outputted from the voltage tracking circuit 6 reflects the bulk voltage to the secondary side of LLC converter 3, the power-off voltage can be determined according to the capacitance decay conditions of different input capacitors, different load conditions and the detected bulk voltages. Consequently, the purpose of dynamically increasing the time of power supply apparatus 1 can be achieved.

In an embodiment, the power supply apparatus 1 further includes a primary side controller 7. The primary side controller 7 is disposed on the primary side of the LLC converter 3. In addition, the primary side controller 7 is electrically connected with the power factor correction circuit 2 for controlling the operations of the power factor correction circuit 2. The primary side controller 7 further detects and correspondingly adjusts the magnitude of the first voltage that is outputted from the power factor correction circuit 2.

In an embodiment, the power supply apparatus 1 further includes an auxiliary controller 40. The auxiliary controller 40 is electrically connected with the auxiliary conversion circuit 4 for controlling the operations of the auxiliary conversion circuit 4. For example, the auxiliary controller 40 is electrically connected with the control terminal of the auxiliary switch S for controlling the operations of the auxiliary switch S.

From the above descriptions, the present disclosure provides a power supply apparatus. The voltage tracking circuit of the power supply apparatus detects the auxiliary voltage from the auxiliary conversion circuit and provides the detection result to the secondary side controller, which is disposed on the secondary side of the LLC converter. According to the ripple change of the DC link voltage, the secondary side controller instantly generates the reverse waveform that is opposite to the waveform of the DC link voltage. According to the reverse waveform, the secondary side controller controls the operations of the LLC converter in order to suppress the voltage ripples of the DC link voltage. The power supply apparatus of the present disclosure can directly customize a corresponding ripple compensation method according to the magnitude of the ripple source. Consequently, regardless of the input capacitance value, the input frequency change or the load change, the secondary side controller can give the optimized ripple compensation value. Furthermore, the secondary side controller instantly generates the reverse waveform opposite to the waveform of the DC link voltage according to the ripple change of the DC link voltage. Consequently, the ripple compensation purpose is achieved. Since the ripple compensation is not based on the output voltage of the power supply apparatus, the power supply apparatus of the present disclosure is capable of performing the ripple compensation for the constant resistance loads and the constant current loads.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply apparatus, comprising:

a power factor correction circuit configured to convert a DC link voltage into a first voltage;

an LLC converter comprising a primary side circuit and a secondary side circuit, which are coupled with each other, wherein the primary side circuit is electrically connected with the power factor correction circuit to receive the first voltage, the first voltage is converted into a second voltage by the LLC converter, and the second voltage is outputted from the secondary side circuit;

an auxiliary conversion circuit electrically connected with the power factor correction circuit and configured to convert the first voltage into an auxiliary voltage;

a secondary side controller disposed on a secondary side of the LLC converter and configured to control operations of the LLC converter; and a voltage tracking circuit electrically connected to the auxiliary conversion circuit and configured to detect the auxiliary voltage and issue a detection signal to the secondary side controller according to a result of detecting the auxiliary voltage, wherein according to the detection signal, the secondary side controller tracks a ripple change of the DC link voltage and instantly generates a reverse waveform opposite to a waveform of the DC link voltage, wherein the secondary side controller controls the operations of the LLC converter according to the reverse waveform, so that secondary side voltage ripples of the DC link voltage are suppressed;

wherein the auxiliary conversion circuit comprises a transformer, and the transformer comprises a primary winding, a first secondary winding and a second secondary winding, wherein a first terminal and a second terminal of the primary winding are electrically connected with the power factor correction circuit, the primary winding is reversely coupled with the first secondary winding and the second secondary winding, a first terminal of the first secondary winding is electrically connected with a ground terminal, a second terminal of the first secondary winding is electrically connected with the voltage tracking circuit, and the auxiliary voltage is outputted from the second terminal of the first secondary winding.

2. The power supply apparatus according to claim 1, wherein the auxiliary conversion circuit further comprises a first diode, a first capacitor, a first resistor, a second diode, a second resistor, an auxiliary switch and a second capacitor, wherein a first terminal of the auxiliary switch is electrically connected with the second terminal of the primary winding, a second terminal of the auxiliary switch is electrically connected with the ground terminal, a first terminal of the second capacitor is electrically connected with the first terminal of the auxiliary switch, a second terminal of the second capacitor is electrically connected with the second terminal of the auxiliary switch, an anode of the first diode is electrically connected with the second terminal of the first secondary winding, a first terminal of the first capacitor is electrically connected with a cathode of the first diode, a second terminal of the first capacitor is electrically connected with the ground terminal, the first resistor and the first capacitor are connected with each other in parallel, a first terminal of the second secondary winding is electrically connected with the ground terminal, an anode of the second diode is electrically connected with a second terminal of the second secondary winding, a first terminal of the second resistor is electrically connected with a cathode of the second diode, and a voltage at a second terminal of the second resistor is the auxiliary voltage.

3. The power supply apparatus according to claim 1, wherein the voltage tracking circuit comprises a third resistor, a third diode, a third capacitor, a fourth resistor, a fifth resistor and a sixth resistor, wherein a first terminal of the third resistor is electrically connected with the second terminal of the first secondary winding, a cathode of the third diode is electrically connected with a second terminal of the third resistor, a first terminal of the third capacitor is electrically connected with an anode of the third diode, the first terminal of the third capacitor is electrically connected with the secondary side controller, the first terminal of the third capacitor issues the detection signal to the secondary side controller, a second terminal of the third capacitor is electrically connected with the ground terminal, a first terminal of the fourth resistor is electrically connected with the anode of the third diode, a first terminal of the fifth resistor is electrically connected with a second terminal of the fourth resistor, a second terminal of the fifth resistor is electrically connected with the ground terminal, a first terminal of the sixth resistor is electrically connected with the second terminal of the fourth resistor, and a second terminal of the sixth resistor is electrically connected with a voltage source.

4. The power supply apparatus according to claim 1, wherein the auxiliary conversion circuit further comprises a fourth capacitor, wherein a first terminal of the fourth capacitor is electrically connected with the first terminal of the primary winding, and a second terminal of the fourth capacitor is electrically connected with the ground terminal.

5. The power supply apparatus according to claim 1, wherein the auxiliary conversion circuit further comprises an inductor, and the inductor is electrically connected between the first terminal and the second terminal of the primary winding.

6. The power supply apparatus according to claim 1, further comprising an auxiliary controller, which is electrically connected with the auxiliary conversion circuit for controlling the auxiliary conversion circuit.

* * * * *